(12) United States Patent
Yue et al.

(10) Patent No.: US 9,195,638 B2
(45) Date of Patent: Nov. 24, 2015

(54) METHOD AND APPARATUS OF PROCESSING NESTED FRAGMENT CACHING OF A WEB PAGE

(75) Inventors: Xuqiang Yue, Hangzhou (CN); Qiyu Dong, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 13/258,947

(22) PCT Filed: Jul. 6, 2011

(86) PCT No.: PCT/US2011/043071
§ 371 (c)(1),
(2), (4) Date: Sep. 22, 2011

(87) PCT Pub. No.: WO2012/009191
PCT Pub. Date: Jan. 19, 2012

(65) Prior Publication Data
US 2013/0111325 A1 May 2, 2013

(30) Foreign Application Priority Data

Jul. 12, 2010 (CN) .......................... 2010 1 0225186

(51) Int. Cl.
*G06F 17/00* (2006.01)
*G06F 17/22* (2006.01)
*G06F 17/30* (2006.01)

(52) U.S. Cl.
CPC ...... *G06F 17/2247* (2013.01); *G06F 17/30902* (2013.01)

(58) Field of Classification Search
CPC .................. G06F 17/2247; G06F 17/30902
USPC ......................................... 715/234, 235, 236
See application file for complete search history.

(56) References Cited

U.S. PATENT DOCUMENTS

| 5,924,116 A | 7/1999 | Aggarwal et al. |
| 6,012,126 A | 1/2000 | Aggarwal et al. |

(Continued)

FOREIGN PATENT DOCUMENTS

| CN | 101539912 A | 9/2009 |
| CN | 101582075 A | 11/2009 |

(Continued)

OTHER PUBLICATIONS

Translation of Chinese Office Action for Application No. 2010-102251862 dated Dec. 20, 2012, 8 pages.

(Continued)

*Primary Examiner* — Stephen Hong
*Assistant Examiner* — Marshon Robinson
(74) *Attorney, Agent, or Firm* — Lee & Hayes, PLLC

(57) ABSTRACT

Nested fragment caching of web pages is described. In response to receiving a request for a web page, first-level fragment information of the web page is obtained. Based on the first-level fragment information, a fragment analysis process is successively performed for first-level fragments, wherein the fragment analysis process includes rendering the first-level fragments based on preset nesting information of the first-level fragments. The nesting information includes information about whether a current fragment includes other fragments. Results of the fragment analysis process are combined to generate complete content of the first-level fragments of the web page. The exemplary embodiments of the present disclosure not only allow nested fragment caching of a web page, but also recursively obtain HTML codes of each fragment when nested fragment caching of the web page is performed, thus displaying complete content of the web page to a user.

19 Claims, 14 Drawing Sheets

(56) References Cited

U.S. PATENT DOCUMENTS

| | | | |
|---|---|---|---|
| 6,026,413 A | | 2/2000 | Challenger et al. |
| 6,108,655 A | * | 8/2000 | Schleimer et al. ............... 1/1 |
| 6,122,666 A | | 9/2000 | Beurket et al. |
| 6,249,844 B1 | | 6/2001 | Schloss et al. |
| 6,442,651 B2 | | 8/2002 | Crow et al. |
| 6,868,439 B2 | | 3/2005 | Basu et al. |
| RE39,184 E | | 7/2006 | Schloss et al. |
| 7,757,158 B2 | * | 7/2010 | Mitsuishi ............... 715/205 |
| 8,046,682 B2 | * | 10/2011 | Lee et al. ............... 715/236 |
| 2002/0016828 A1 | | 2/2002 | Daugherty et al. |
| 2003/0187935 A1 | * | 10/2003 | Agarwalla et al. ............ 709/206 |
| 2003/0188009 A1 | | 10/2003 | Agarwalla et al. |
| 2003/0188016 A1 | * | 10/2003 | Agarwalla et al. ............ 709/241 |
| 2008/0005093 A1 | | 1/2008 | Liu et al. |
| 2008/0005273 A1 | | 1/2008 | Agarwalla et al. |
| 2009/0217145 A1 | | 8/2009 | Watson |
| 2011/0055683 A1 | | 3/2011 | Jiang |

FOREIGN PATENT DOCUMENTS

| | | |
|---|---|---|
| JP | 2003022203 | 1/2003 |
| JP | 2005513640 | 5/2005 |
| JP | 2009199173 | 9/2009 |

OTHER PUBLICATIONS

Japanese Office Action mailed Apr. 14, 2015 for Japanese Patent Application No. 2013-519708, a counterpart foreign application of U.S. Appl. No. 13/258,947, 10 pages.

PCT Search Report mailed Nov. 14, 2011 for PCT application No. PCT/US11/43071, 9 pages.

* cited by examiner

METHOD AND APPARATUS OF PROCESSING NESTED FRAGMENT CACHING OF A WEB PAGE

CROSS REFERENCE TO RELATED PATENT APPLICATIONS

This application is a national stage application of an international patent application PCT/US11/43071, filed Jul. 6, 2011, which claims priority from Chinese Patent Application No. 201010225186.2, filed Jul. 12, 2010, entitled "Method and Apparatus of Processing Nested Fragment Caching of a Web Page," which applications are hereby incorporated in their entirety by reference.

TECHNICAL FIELD

The present disclosure relates to the field of network data processing, especially to a method and an apparatus of processing nested fragment caching of a web page.

BACKGROUND

When a user requests a web page from a web server at the first time, a web browser (e.g. IE browser) may speed up accessing the web page by using cumulative acceleration. The web browser may store content of previously accessed web pages (including images and cookie files, for example) in a computer. This storage space of the computer may be called an IE cache space. Thereafter, every time when a web page is visited, the IE browser may first look up this cache space. If the cache space includes currently accessed content, the IE browser may directly read the content from the cache without downloading the content from the Internet, thus increasing the speed of accessing the web page.

For web page caching, two methods exist in current technology. One method is called page caching, which performs caching of an entire web page that is accessed. Another method is called fragment caching, which divides an accessed web page into multiple fragments (e.g., one fragment for image data, another fragment for text data, etc.,) and caches content of a particular fragment.

However, since contents of certain fragments of a web page may be related, nested caching may sometimes be needed for some fragments. For example, if fragment A may include fragment B, and fragment B may include fragment C in a nested form, the existing technology will fail to support a situation in which the fragment A and the fragment C require caching while fragment B does not.

Currently, one technical problem that one of ordinary skill in the art urgently needs to resolve is to propose a novel method of processing nested fragment caching of a web page in order to overcome the deficiencies of the existing technology in handling nested fragment caching and subsequent recursive processing.

SUMMARY

A technical problem to be addressed by the present disclosure is to provide a method of processing page caching, which may be used to overcome the deficiencies of existing technology in handling nested fragment caching and subsequent recursive processing. The present disclosure further provides an apparatus of processing page caching, which may be used to ensure implementing and applying the aforementioned method in practice.

In order to solve the above problems, the present disclosure provides a method of processing page caching, which may include, in response to receiving a request for a web page, obtaining first-level fragment information of the web page. Based on the first-level fragment information, a fragment analysis process for first-level fragments is successively performed, wherein the fragment analysis process includes rendering the first-level fragments based on predetermined nesting information of the first-level fragments. The nesting information includes information about whether a current fragment includes other fragments. The results of the fragment analysis process are combined to generate complete content of the first-level fragments of the web page.

The present disclosure further provides a method of processing web page caching, which may include receiving a request for a web page and determining whether to perform page caching for the requested web page. If affirmative, the web page can be directly rendered to obtain content of the web page. However, if not affirmative, the method includes obtaining first-level fragment information of the web page based on the first-level fragment information, and successively performing a fragment analysis process for first-level fragments. The fragment analysis process includes rendering the first-level fragments based on preset nesting information of the first-level fragments and the nesting information includes information about whether a current fragment includes other fragments. The results of the fragment analysis process are combined to generate complete content of the first-level fragments of the web page.

The present disclosure provides an apparatus of processing nested fragment caching of web pages. The apparatus includes an acquisition module configured to obtain first-level fragment information of a web page in response to receiving a request for the web page. A fragment analysis module is also included and configured to perform a fragment analysis process for first-level fragments based on first-level fragment information. The fragment analysis process includes rendering the first-level fragments based on predetermined nesting information of the first-level fragments and the nesting information includes information about whether a current fragment includes other fragments. The apparatus further includes a combination and assembly module configured to combine rendering results of the rendering to generate complete content of the first-level fragments of the web page.

The present disclosure further provides an apparatus of processing web page caching, which may include a web page request receiving module configured to receive a request for a web page. A determination module may also be included and configured to determine whether to perform page caching for the requested web page. A direct rendering module is configured to directly render the web page to obtain content of the web page if a result of the determination module is affirmative. The apparatus may also include a nested fragment caching apparatus that is configured to obtain first-level fragment information of the web page if the result of the determination module is not affirmative. The nested fragment caching apparatus may successively perform a fragment analysis process for first-level fragments based on the first-level fragment information, wherein the fragment analysis process includes rendering the first-level fragments based on predetermined nesting information of the first-level fragments. The nesting information includes information about whether a current fragment includes other fragments. The nested fragment caching apparatus combines rendering results of the rendering to generate complete content of the first-level fragments of the web page.

Compared with existing technology, the present disclosure has several advantages. Exemplary embodiments of the present disclosure not only allow nested fragment caching of a web page, but also recursively obtain HTML codes of each fragment when nested fragment caching of the web page is performed, thus displaying complete content of the web page to a user and remedying the gap in existing technology. In the exemplary embodiments, a caching system may be implemented through a distributed server cluster, where the distributed server cluster can adopt horizontal expansion approach to increase the number of servers serving as the caching system. As such, if any one of the servers has stored HTML codes of a fragment, other servers of the distributed cluster may not be needed to store the HTML codes. Further, the technical scheme described in the exemplary embodiments allow recursive nesting of fragments without restricting number of levels, and setting different cache times for each fragment. Understandably, any product implementing the present disclosure does not need to achieve all the above advantages at the same time.

DESCRIPTION OF DRAWINGS

In order to more clearly understand the technical scheme of the exemplary embodiments of the present disclosure, accompanying figures that are used to explain the exemplary embodiments are briefly described. The following figures only constitute a few exemplary embodiments of the present disclosure. Based on these accompanying figures, one skilled in the art can envision other embodiments and figures.

DETAILED DESCRIPTION

Figure 1:
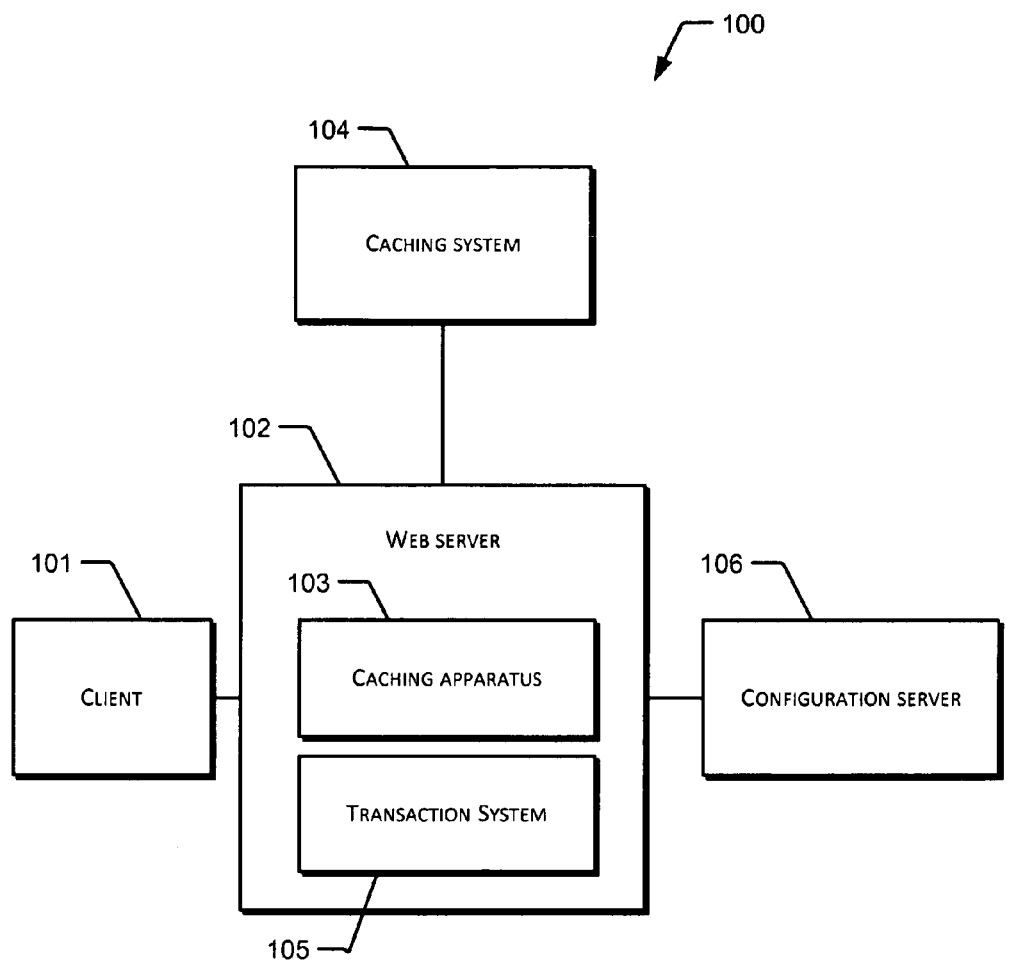
FIG. 1 is a structural diagram illustrating a system described in an exemplary embodiment of the present disclosure.

The technical scheme in the exemplary embodiments of the present disclosure will be described clearly and completely below using the accompanying figures in the exemplary embodiments. Understandably, the exemplary embodiments described herein only constitute parts, but not all, of exemplary embodiments of the present disclosure. Based on the exemplary embodiments of the present disclosure, one skilled in the art can obtain all other exemplary embodiments, which are still within the scope of the present disclosure.

The disclosed method, apparatus, and system may be used in an environment or in a configuration of universal or specialized computer system(s). Examples include a personal computer, a server computer, a handheld device or a portable device, a tablet device, a multi-processor system, and a distributed computing environment including any system or device above.

The disclosed method, apparatus, and system can be described in the general context of computer-executable instructions, e.g., program modules. Generally, the program modules can include routines, programs, objects, components, data structures, and the like that perform particular functions or implement particular abstract data types. The disclosed method and system can also be practiced in a distributed computing environment where functions are performed by remote processing devices that are linked through a communication network. In a distributed computing environment, the program modules may be located in local and/or remote computer storage media, including memory storage devices.

One of the main ideas of the present disclosure may include, setting nesting information and caching information of each fragment of a web page in advance. The nesting information may include information about whether a current fragment includes other fragments. Further, the nesting information corresponding to each fragment may be saved in a web template of a web server such that when a fragment is currently analyzed, corresponding nesting information may be read from the web page template. The information included in the web page template may further include fragment names and fragment parameters, where each fragment may be identified by a fragment name, and the fragment parameters may be determined according to a transaction. The transaction refers to a particular request of a user, and a function that fulfills the particular request of the user corresponds to a specific business. The caching information includes information about whether a fragment needs to be cached and information caching time duration of the fragment that needs to be cached. The caching information may be stored in a configuration server. When a web page is cached or when nested fragment caching is performed for a fragment of the web page, the caching information may be dynamically obtained from the configuration server. In the present disclosure, when a request for a web page is received, determination is made as to whether page caching is needed for the requested web page. If needed, the web page is directly rendered to obtain the web page's content. If not needed, first-level fragment information of the web page may be obtained. Based on the first-level fragment information, a fragment analysis process is successively performed for first-level fragments. The fragment analysis process may include rendering the first-level fragments based on preset nesting information of the first-level fragments, where the nesting information includes information about whether a current fragment includes other fragments; and combining results of the fragment analysis process to generate complete content of the first-level fragments of the web page.

It is noted that in the exemplary embodiments of the present disclosure, the fragments of the web page may include at least two levels of fragments, and each level may include one or more fragments. A first-level fragment may have a parent-and-child relationship with a second-level fragment. However, not every first-level fragment includes a second-level fragment. Alternatively, one or more of the first-level fragments may include a second-level fragment. In addition, the second-level fragment may include a third-level fragment and so forth. In the present disclosure, such a nesting relationship is referred to as recursive nesting. Furthermore, caching information of fragments in different levels may be independent of one another. For example, a fragment in a current level may be pre-set to be cached, a sub-fragment in a next lower level may be set to be not cached, and a sub-fragment of the sub-fragment of the next lower level may be set as to be cached, etc. The caching information may be set in advance and stored in the configuration server. Understandably, this pre-set caching information in the configuration server may be updated in real time during subsequent uses.

FIG. 1 shows a structural diagram of a system 100 according to an embodiment of the present disclosure. A user requests via a client 101 a web page from a web server 102. The client may be implemented as any number of devices having processing and memory capabilities, including both mobile and non-mobile devices. The web server 102 represents any number of server architectures that include processing and memory capabilities, such as individual servers, server clusters, sever farms, data centers, or mainframe computing systems.

A caching apparatus 103 may be integrated in the web server 102. The caching apparatus 103 may be implemented as an additional functional entity in the web server 102, or as a stand-alone functional entity. The caching apparatus 103 may perform recursive processing during nested fragment caching of a web page, as described in the exemplary embodiments. A caching system 104 is used for storing HTML codes of each fragment or a web page. The caching apparatus 103 may request HTML codes of a fragment or a web page from the caching system 104. If the caching system 104 does not include HTML codes of the fragment or the web page, a transaction system 105 of the web server 102 will be responsible for providing the HTML codes of the fragment or the web page. The transaction system 105 can be considered as a system made up of multiple modules in the web server, that currently fulfils a transaction associated with a certain user request.

It is noted that in a practical application of the present disclosure, HTML codes may not be cached in a caching system. Rather, the HTML codes may be directly stored locally in a client 101 (e.g., cached directly in device memory of the client). The client 101 and the web server 102 may exchange the HTML codes directly with each other. If the client cannot find HTML codes corresponding to a fragment or a web page locally, the client 101 may trigger the transaction system 105 of the web server 102 to perform a search. If the client finds corresponding HTML codes locally, the client may display the HTML codes directly onto the requested web page of the user. However, because such approach has a relative high performance requirement for local memory or computer and because there are a large variety of web pages, separate distributed cluster servers are normally used as a caching system as described in the embodiments of the present disclosure.

A system framework described in the embodiments of the present disclosure may further include a configuration server 106. The configuration server 106 may provide caching information of each fragment to the caching apparatus 103. The disclosed system may, however, be implemented without the configuration server 106. In such case, caching information may be set up in advance for each fragment in the web server at one time. Similar to fixed parameters of a fragment that are unchangeable, the caching information of each fragment in the caching system may not be dynamically modifiable.

In exemplary embodiments, the caching information may be implemented in a textual form. Alternatively, the caching information may be embedded as an object in a program. If the caching information is embedded as an object in a program, the caching information may be obtained from THREAD_LOCAL to determine whether corresponding current fragment includes other nested fragments or whether a certain nesting includes an endless loop. THREAD_LOCAL is a thread-level variable in the web server, and may provide caching information from the configuration server to the caching apparatus in a given request process.

The disclosed method for processing web page caching not only can implement whole page caching that is implemented in existing technology, but can also implement nested fragment caching of web pages that cannot be achieved in the existing technology, thus remedying the deficiency in the existing technology.

First Exemplary Embodiment

Figure 2:
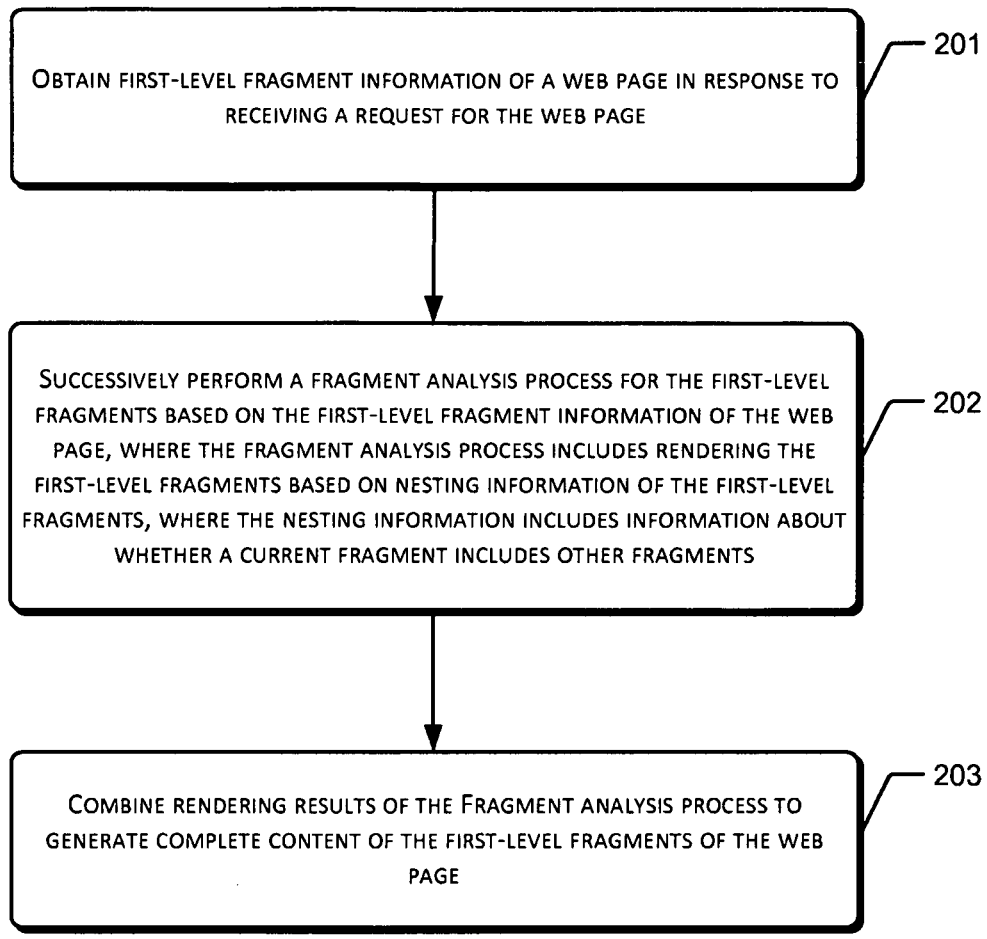
FIG. 2 is a flow chart illustrating a method of processing web page caching in accordance with a first exemplary embodiment of the present disclosure.

FIG. 2 shows a flow chart illustrating a first exemplary method of processing web page caching, which may include the following operations illustrated as enumerated blocks.

At 201, first-level fragment information of a web page is obtained in response to receiving a request for the web page. In this exemplary embodiment, once a web page is determined, first-level fragment information associated with the web page may also be determined. It is because formats of fragments (such as information including what fragments are divided from the web page, positions and names of these fragments, etc.) of a same web page are the same. Each fragment in the web page is essentially a placeholder, and this placeholder may be used in other web pages. Only when a final rendering result of a fragment has been obtained will associated placeholder be replaced with specific content of the fragment. In general, specific content of a fragment refers to HTML (HyperText Mark-up Language) codes that correspond to the fragment.

In this exemplary embodiment, the fragments in the web page may be cached in a nested form. If a first-level fragment A includes a second-level fragment B and the second-level fragment B includes a third-level fragment C, nested caching may be understood as a function to cache the first-level fragment A and the third-level fragment C without caching the second-level fragment B based on predetermined caching information of the fragments A, B, and C. However, regardless of whether the first-level fragment includes other fragments, what to be obtained at this block is first-level fragment information. Nesting information of the first-level fragments may be successively obtained when these first-level fragments are analyzed thereafter.

At 202, a fragment analysis process is successively performed for the first-level fragments based on the first-level fragment information of the web page. The fragment analysis process may include rendering the first-level fragments based on nesting information of the first-level fragments, where the nesting information includes information about whether a current fragment includes other fragments.

Upon obtaining the first-level fragment information of the web page, an analysis process is performed for the first-level fragments because nesting information of each first-level fragment may be dynamically obtained from a configuration server during the analysis process of the fragments. The nesting information may include information about whether a current first-level fragment includes a second-level fragment, and information of the included second-level fragment. All first-level fragments are analyzed at this block. The fragment analysis process of each first-level fragment may be performed concurrently or sequentially. The order in which this fragment analysis process is carried out, however, does not affect implementations of the exemplary embodiments of the present disclosure.

The rendering process described at this block includes searching HTML codes that correspond to specific contents of the first-level fragments based on respective fragment names and respective fragment parameters of the first-level fragments. The rendering process is similar to a rendering process of the existing technology and therefore is not described in further detail herein.

At 203, rendering results of the rendering are combined to generate complete content of the first-level fragments of the web page. As one example of this operation, if a first-level fragment does not include other fragments, associated rendering results include HTML codes of that first-level fragment. If a first-level fragment includes a second-level fragment, or if the second-level fragment further includes a third-level fragment, or even if, by way of recursion, an N−1-level fragment includes an N-level fragment, a rendering result of the first-level fragment may include HTML codes of the fragments from the second level to the N level. Rendered contents of the first-level fragment may therefore be combined to generate content of the first-level fragment of the web page.

Second Exemplary Embodiment

Figure 3:
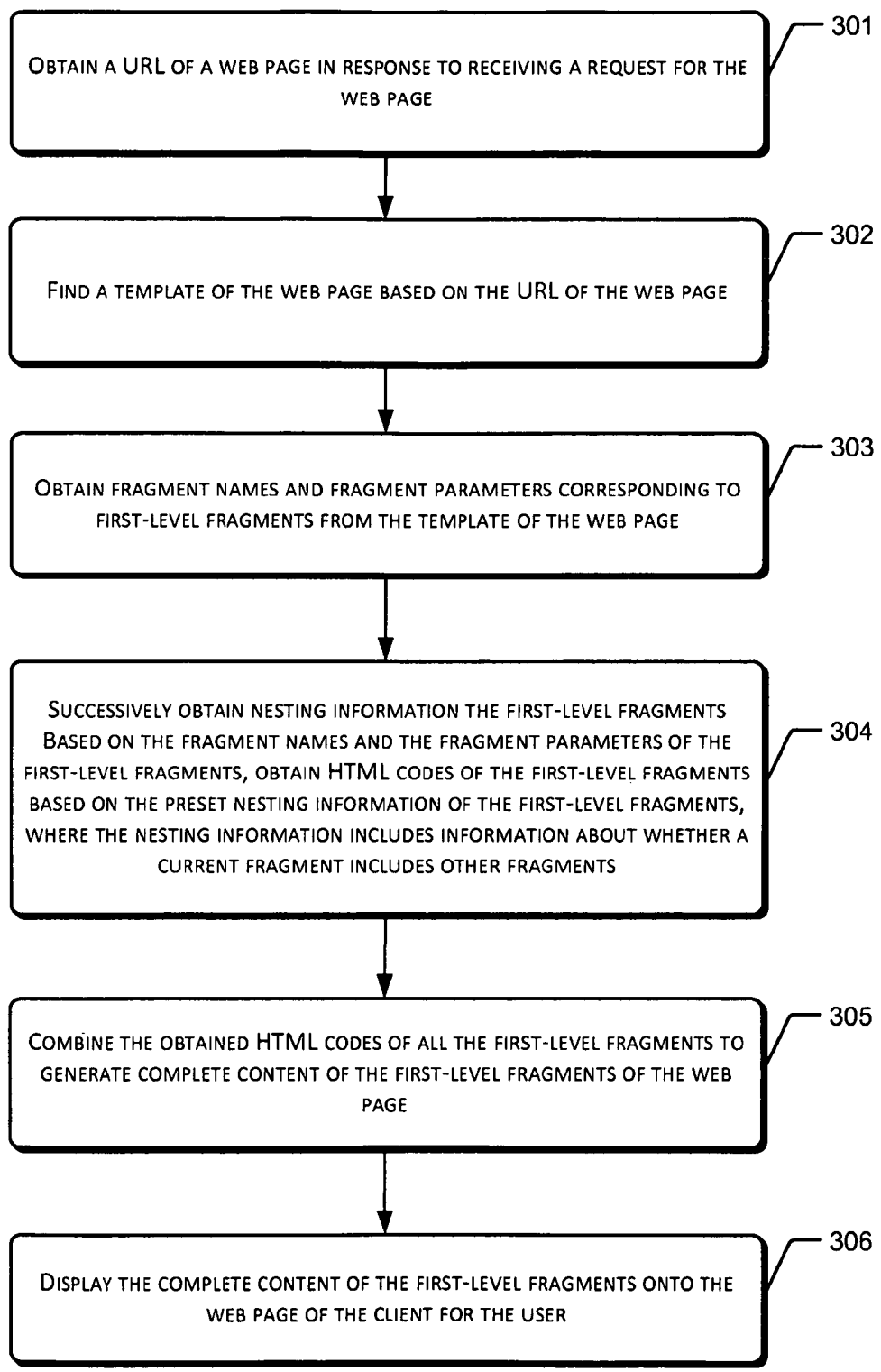
FIG. 3 is a flow chart illustrating a method of processing web page caching in accordance with a second exemplary embodiment of the present disclosure.

FIG. 3 shows a flow chart illustrating a second exemplary method of processing web page caching, which may include the following method operations illustrated as blocks.

At 301, a URL of a web page is obtained in response to receiving a request for the web page. As one example of this operation, a URL (Uniform/Universal Resource Locator) of a web page is first obtained when a request for the web page is received. A "product detail" web page of a certain network trading platform may be used as an example. Assume, for example, a URL address of this "product detail" web page is xxx.xxx.com/detail.html?id=123.

At 302, a template of the web page is found based on the URL of the web page. As each web page has a unique URL and a template, the template used by a web page may be determined based on the URL of the web page. If template information of the "product detail" web page is "detail.vm", template information may be determined as "detail.vm" based on the "product detail" web address of at this block.

It should be noted that a template used by each web page may be independent of each other or may be shared among multiple web pages. When a template is used, a web page needs to populate fragment portions prescribed in the template.

At 303, the process obtains fragment names and fragment parameters corresponding to first-level fragments from the template of the web page. After the template of the web page has been determined, a fragment format of the web page corresponding to the template may be determined accordingly. Different from existing technology, not only does a web page include first-level fragments, but the first-level fragments may also include at least one level of fragments recursively. At this block, however, fragments obtained from the web page may include only fragment names and fragment parameters corresponding to the first-level fragments. The fragment parameters may be determined according to a transaction. The transaction refers to a particular request of a user, and a function that fulfills the particular request of the user corresponds to a specific business. For example, for "shopkeeper information", a corresponding fragment parameter may be a selling user ID. If the "product detail" web page is used as an example, corresponding fragment parameters may be product information and a selling user ID.

The following approach may be used to introduce a fragment into a template: if, for example, a fragment name is "shopkeeper information" and a template name is "product detail", a code for referencing a fragment of "shopkeeper information" in "product detail" may be:

control.set("userInfo").addPrams("userId",1234)

Content in "addPrams" is a fragment parameter corresponding to the "shopkeeper information" fragment, and userId corresponds to an ID of a user, which is "1234". The code portion "control.set("userInfo")" indicates that this fragment is referenced in the "product detail" template. Understandably, this code implementation is merely an example, and should not be construed as a limitation in the present disclosure.

At 304, the process obtains nesting information of the first-level fragments based on the fragment names and fragment parameters of the first-level fragments, and further obtains respective HTML codes of the first-level fragments based on the nesting information of the first-level fragments. The nesting information includes information about whether a current fragment includes other fragments.

At 304, nesting information and HTML codes of the first-level fragments may be obtained when the fragment names and the fragment parameters of the first-level fragments are obtained. Specifically, in one implementation, the nesting information may be obtained from the configuration server 106 which may send the nesting information to the caching apparatus 103 of the web server. HTML codes of a fragment may include such information as an image or a text to be displayed in the web page. This fragment and its corresponding HTML codes may be used by templates of other web pages. For example, a "shopkeeper information" fragment in a "product detail" web page of a selling user and a "shopkeeper information" fragment in a "shop web page" in a network trading platform may belong to the same fragment.

Figure 4:
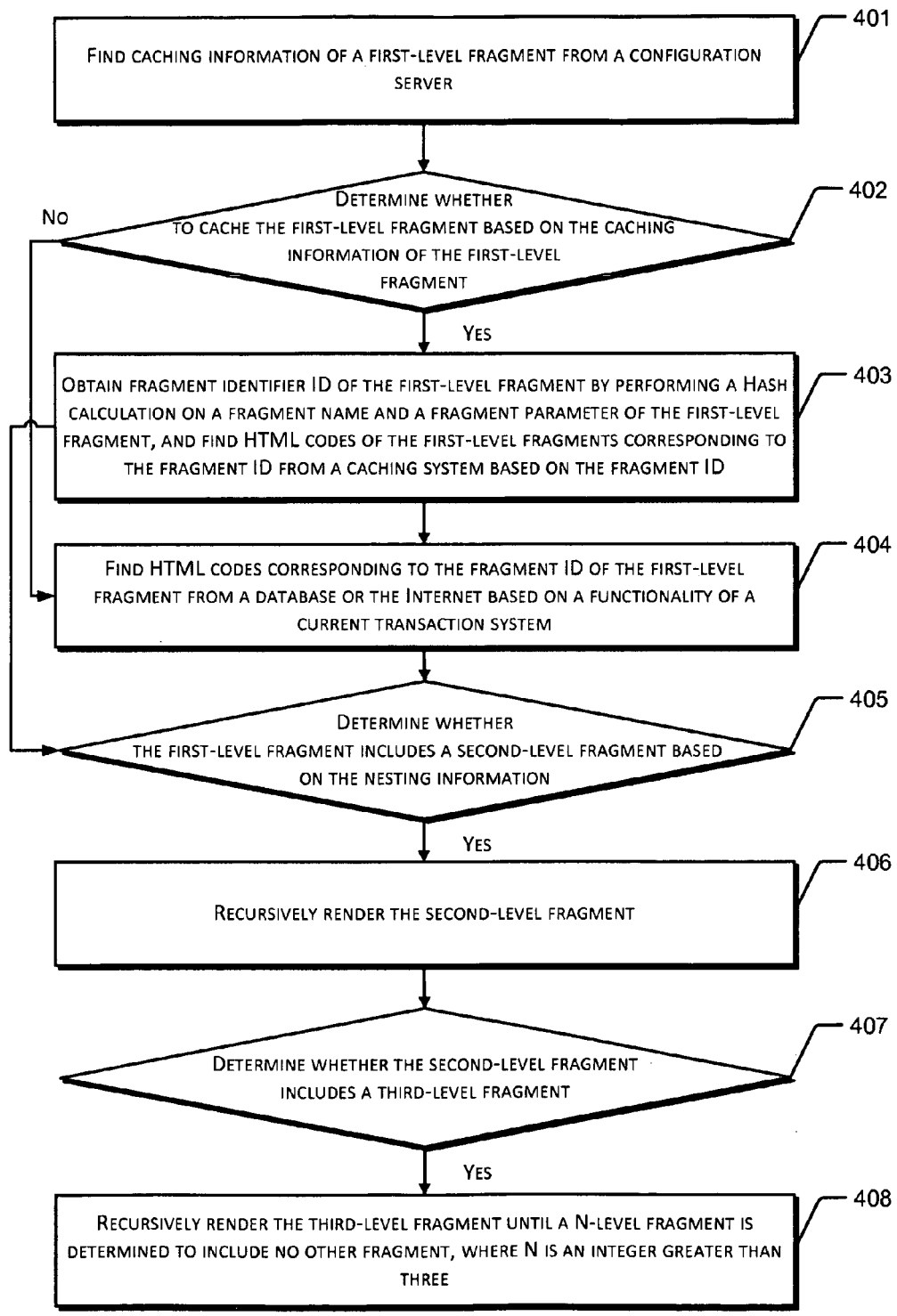
FIG. 4 is a flow chart illustrating a block 304 described in the second exemplary embodiment of the present disclosure.

FIG. 4 shows one example process of obtaining HTML codes of a first-level fragment when all HTML codes of the first-level fragments are to be obtained, as noted generally as part of operation block 304 in FIG. 3. The process may include the following operations.

At 401, the process searches caching information of a first-level fragment from the configuration server 106. The caching information includes information about whether the fragment needs to be cached and caching time duration of the fragment that needs to be cached.

The configuration server keeps a record of caching information of fragments of each level of a web page. The caching information includes information about whether a fragment needs to be cached and caching time duration of the fragment that needs to be cached. The caching time duration is used to indicate valid time of a current fragment in the caching system. If the current fragment has been cached in the caching system for a time longer than corresponding caching time duration, the fragment is expired and the caching system will no longer include content specific to the fragment. This caching information may be set in advance. Understandably, if caching information of a certain fragment needs to be modified thereafter, this may be achieved by directly modifying the information stored in the configuration server. As such, the caching information found in the configuration server is the most updated one. The caching information may be implemented to have '1' representing that a current fragment needs to be cached, and '0' representing that the current fragment need not to be cached. For implementation of caching time duration information, a relationship between the caching duration information and such information as the fragment name or fragment parameter may directly be constructed. Understandably, in practical applications, there are many ways to implement the caching information, and the exemplary embodiments of the present disclosure do not have any limitations thereon.

It should be noted that since an expiration time for caching is controlled by the caching system, the caching apparatus may not know when a current web page or fragment will expire when performing a process described in the exemplary embodiments. When the caching apparatus does not find the current web page or fragment when searching the caching system, this may indicate that content of the current fragment has already been expired.

At 402, the process determines whether a first-level fragment needs to be cached based on the caching information of the first-level fragment. If affirmative, the process continues to block 403. If not, the process continues to block 404.

According to the example described at 401, if obtained information that represents whether a fragment needs to be cached is '1', that fragment is set to be cached.

At 403, the process applies a hash calculation on the fragment name and the fragment parameter of the first-level fragment to obtain a fragment ID of the first-level fragment, and based on the fragment ID, searches for HTML codes of the first-level fragment that correspond to the fragment ID from the caching system. The process continues to block 405.

Figure 5:
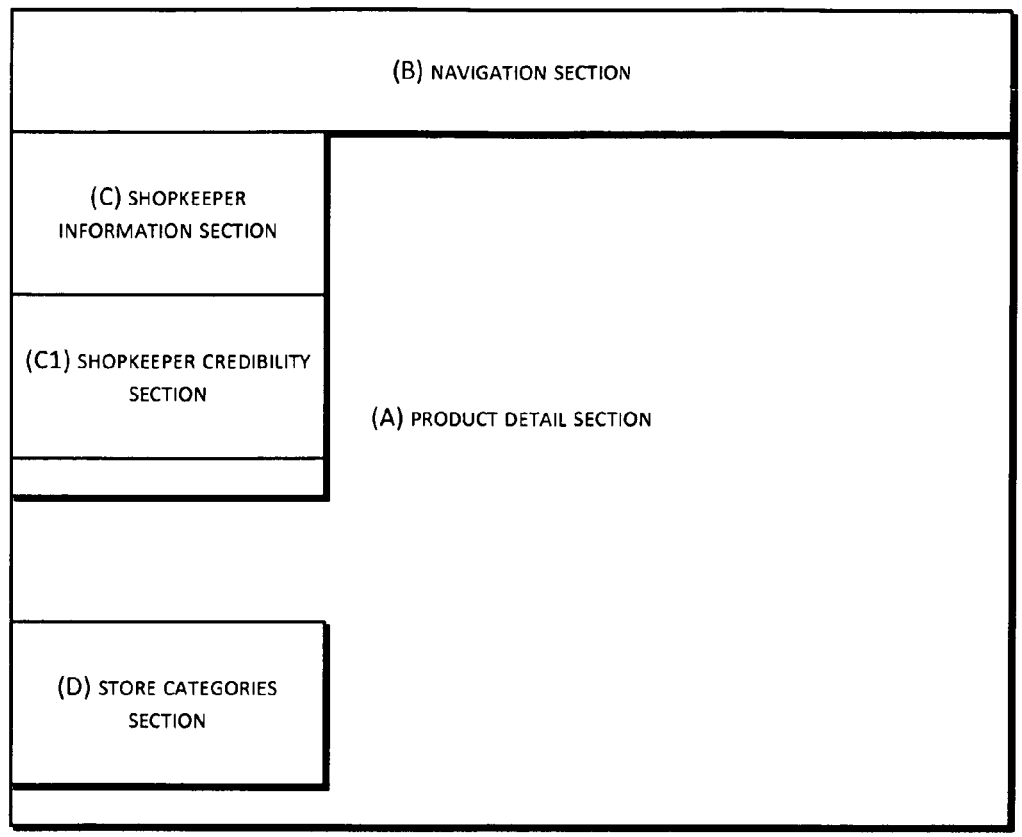
FIG. 5 is a schematic diagram illustrating a fragment name of a first-level fragment described in the second exemplary embodiment of the present disclosure.

FIG. 5 shows representative fragment names of first-level fragments according to one example. The first-level fragments of the web page may include a "description" fragment A, a "navigation" fragment B, a "shopkeeper information" fragment C, and a "store categories" fragment D. The "shopkeeper information" fragment C may further include a second-level "shopkeeper's credibility" fragment C1.

Returning to block 403 in FIG. 4, a hash calculation may be performed on the fragment name and the fragment parameter of the first-level fragment. Corresponding calculation result serves as a fragment ID of the first-level fragment, which is generally 32-digit in length. Based on this 32-digit fragment ID, HTML codes corresponding to the fragment ID may be searched and obtained from the caching system. The caching system stores a correspondence relationship between each fragment ID and corresponding relationship HTML codes, as well as the HTML codes.

It should be noted that a process of rendering the first-level fragment may include generating a placeholder for a location of the first-level fragment in the web page and obtaining corresponding HTML codes, and in response to obtaining the HTML codes, replacing the placeholder of the first-level fragment by the HTML codes. When rendering is performed for a fragment, regardless of its level in the web page, the above process may be used to perform rendering. The placeholder can be understood as a location for the fragment, in which content may be added during a subsequent operation.

At 404, the transaction system 105 of the web server 102 finds HTML codes corresponding to the fragment ID of the first-level fragment. The process continues to block 405. If a current fragment is indicated not to be cached, the transaction system 105 of the web server may perform rendering of the current fragment, and a rendering result thereof is HTML codes of the current fragment. Specifically, the rendering module of the transaction system finds the HTML codes corresponding to the fragment ID from a database, or a search engine, or a document system.

At 405, it is determined whether the first-level fragment includes a second-level fragment based on preset nesting information of the first-level fragment. If affirmative, the process continues to block 406. If not, the rendering process for the first-level fragment is terminated. The operation at block 405 may optionally determine whether a currently analyzed first-level fragment includes a second-level fragment based on the nesting information.

At 406, the process performs recursive rendering for the second-level fragment. Recursive rendering may include generating, for a fragment to be processed, a placeholder in a fragment which level is above the fragment to be processed, obtaining HTML codes of the fragment to be processed based on a fragment name and a fragment parameter of the fragment to be processed, replacing the placeholder for the fragment to be processed by the HTML codes of the fragment to be processed. The process continues to block 407.

This block recursively performs rendering for a second-level fragment when the first-level fragment includes the second-level fragment. Specifically, a placeholder for the second-level fragment is first generated in the first-level fragment. Based on a fragment name and a fragment parameter of the second-level fragment, HTML codes of the second-level fragment may be obtained using the same approach as described above. Specifically, the same approach may include performing a hash calculation on the fragment name and the fragment parameter of the second-level fragment to obtain a 32-digit ID of the second-level fragment. When the second-level fragment needs to be cached, corresponding HTML codes may be obtained from the caching system based on the ID. If corresponding HTML codes are not found in the caching system, or if the second-level fragment does not need to be cached, corresponding HTML codes may be obtained from a database or the Internet according to associated transactional functionality. Upon finding the HTML codes, the placeholder for the second-level fragment may be replaced by the HTML codes of the second-level fragment.

At 407, the process continues to determine whether the second-level fragment includes a third-level fragment. If affirmative, the process continues to block 408. If not, the rendering process for the second-level fragment is terminated. More particularly, upon finding the HTML codes of the second-level fragment, a determination is made as to whether the second-level fragment includes a third-level fragment. If the second-level fragment does not include a third layer fragment, the rendering process for the second-level fragment is completed and terminated.

More specifically, if the second-level fragment includes a third-level fragment, content of the second-level fragment is first rendered. Further, a placeholder for the third-level fragment is generated at a location corresponding to the third-level fragment in the second-level fragment. Thereafter, the third-level fragment is rendered. Rendered content of the third-level fragment is filled into the placeholder in the second-level fragment. A result thereof is HTML codes of the second-level fragment. Use the above-mentioned shopkeeper information as an example. Information of the "shopkeeper information" fragment includes a "credibility" fragment. During a recursive rendering process, the "shopkeeper information" fragment is first rendered. A placeholder is generated at a location of the "credibility" fragment in the "shopkeeper information" fragment. Thereafter, the "credibility" fragment is rendered, and rendered content of the "credibility" fragment is filled into the placeholder in the "shopkeeper information" fragment. In the end, a rendering result of the "shopkeeper information" fragment is returned.

At 408, the process recursively performs rendering for the third-level fragment until an N-level fragment determined to include no other fragment is obtained, where N is an integer greater than 3. At this block, rendering is performed recursively for the first-level fragment and the second-level fragment, until an N-level fragment determined to include no other fragment is obtained, where N is an integer greater than 3.

Returning now to block 305 of FIG. 3, the process of FIG. 3 combines the obtained HTML codes of all the first-level fragments to generate complete content of the first-level fragments of the web page.

At this block, rendering results of the first-level fragments are combined. The rendering results refer to HTML of the first-level fragments. If a first-level fragment recursively includes at least one level of fragment, a rendering result of the first-level fragment includes HTML codes of the at least one level of fragment. This block combines the HTML codes of all the fragments to form complete content of the first-level fragments of the web page.

At 306, the process displays to the user the complete content of the first-level fragments onto the web page of the client. The generated complete content of the first-level fragment is presented on the web page of the client for the user. The displayed result is the web page content that is seen by the user.

This exemplary embodiments not only allows nested fragment caching of a web page, but also recursively obtains HTML codes of each fragment when nested fragment caching of the web page is performed, thus displaying complete content of the web page to a user and remedying the gap in existing technology.

Third Exemplary Embodiment

Figure 6:
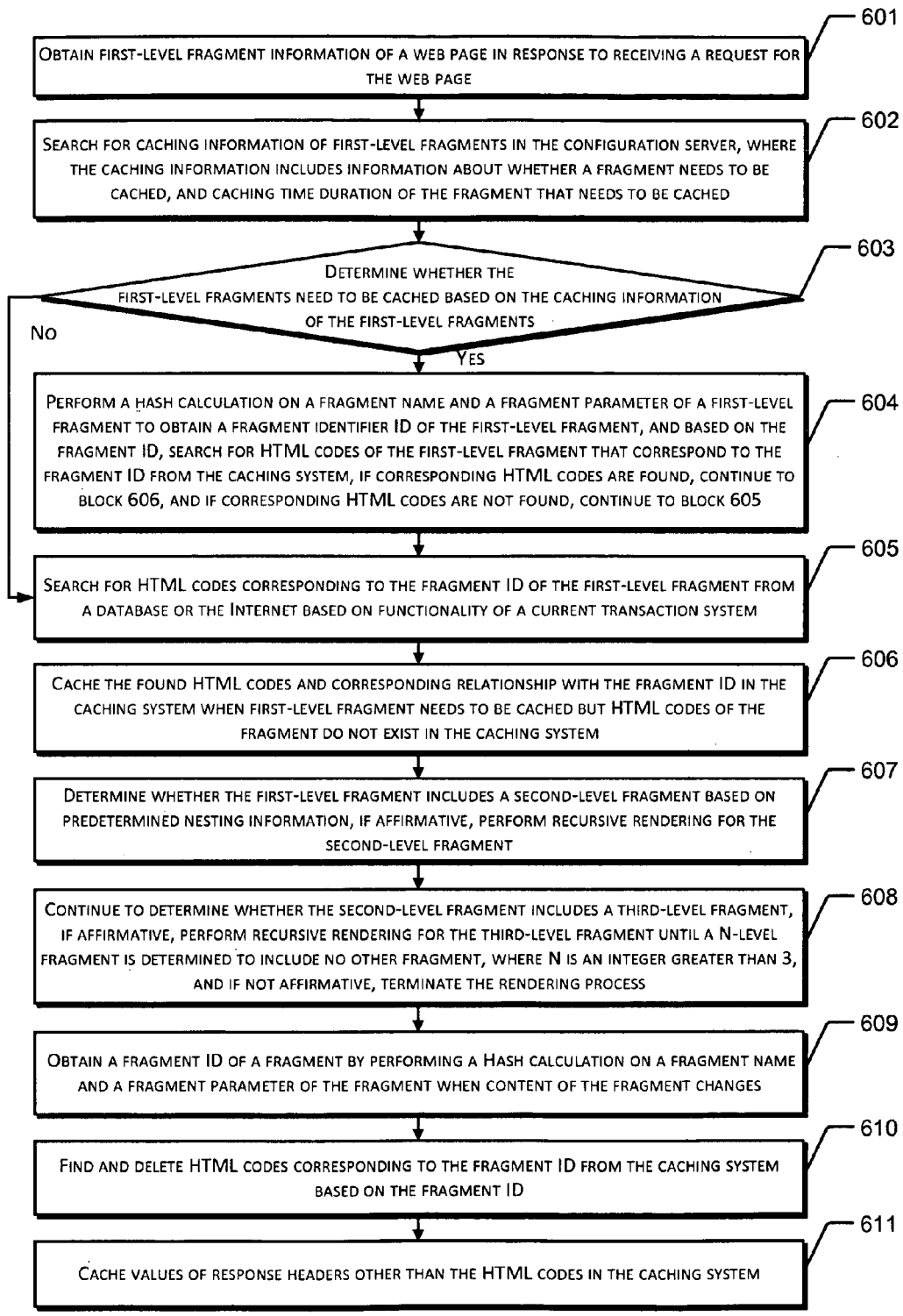
FIG. 6 is a flow chart illustrating a method of processing web page caching in accordance with a third exemplary embodiment of the present disclosure.

FIG. 6 shows a flow chart illustrating a third exemplary method of processing web page caching. This exemplary embodiment can be understood as an example application of the method of processing web page caching, which may include the following method operations illustrated as blocks in FIG. 6.

At 601, the process obtains first-level fragment information of a web page in response to receiving a request for the web page.

At 602, the process searches for caching information of first-level fragments in the configuration server 106. The caching information includes information about whether a fragment needs to be cached, and caching time duration of the fragment that needs to be cached.

At 603, it is determined whether the first-level fragments need to be cached based on the caching information of the first-level fragments. If affirmative, the process continues to block 604. If not, the process continues to block 605.

At 604, the process performs a hash calculation on a fragment name and a fragment parameter of a first-level fragment to obtain a fragment ID of the first-level fragment, and based on the fragment ID, searches for HTML codes of the first-level fragment that correspond to the fragment ID from the caching system 104. As part of this operation, although the first-level fragment needs to be cached, corresponding HTML codes of the first-level fragment may not be found in the caching system 104. For example, HTML codes may not be found in such situations when a caching time for the first-level fragment has been reached or when content of the first-level fragment has expired. A caching time of each level's fragment may be set in advance, and may be stored in the configuration server 106. If the HTML codes are found, the process continues to block 606. If HTML codes are not found, the process continues to block 605.

At 605, the transaction system 105 of the web server 102 will be responsible to find HTML codes that correspond to the fragment ID.

At 606, when a first-level fragment needs to be cached but HTML codes of the fragment do not exist in the caching system 104, the found HTML codes and corresponding relationship with the fragment ID are cached in the caching system. Since the HTML codes of the first-level fragment that need to be cached have not been stored in the caching system, the found HTML codes may be saved in the caching system after block 605 is executed. If the first-level fragment does not need to be cached, the found HTML codes of the first-level fragment may not need to be saved in the caching system.

It is noted that, although block 606 follows after block 605, block 606 is optionally executed when the first-level fragment's HTML codes that need to be cached have not been stored in the caching system. Thus, block 606 may not be an essential block for this exemplary embodiment.

At 607, it is determined whether the first-level fragment includes a second-level fragment based on predetermined nesting information. If affirmative, recursive rendering is performed for the second-level fragment. Recursive rendering may include generating, for a fragment to be processed, a placeholder in a fragment which level is above the fragment to be processed, obtaining HTML codes of the fragment to be processed based on a fragment name and a fragment parameter of the fragment to be processed, and replacing the placeholder for the fragment to be processed by the HTML codes of the fragment to be processed.

At 608, the process continues to determine whether the second-level fragment includes a third-level fragment. If affirmative, recursive rendering is performed for the third-level fragment until an N-level fragment is determined to include no fragment, where N is an integer greater than 3. Otherwise, the rendering process is terminated.

Blocks 607 and 608 of this exemplary embodiment have already been described in detail in the previous exemplary embodiments. Because implementation of this exemplary embodiment is equivalent to implementations of previous exemplary embodiments, blocks 607 and 608 are not described in further detail.

At 609, when content of a certain fragment changes, a fragment ID of that fragment may be obtained by performing a hash calculation on a fragment name and a fragment parameter of that fragment.

At 610, the process finds and deletes HTML codes corresponding to the fragment ID from the caching system based on the fragment ID.

In this exemplary embodiment, blocks 609 and 610 may be implemented as a function to voluntarily invalidate HTML codes of a fragment that are stored in the caching system. Voluntarily invalidity may be interpreted as: even although a caching time of a certain fragment has not yet expired, corresponding HTML codes of the fragment may be deleted from the caching system through blocks 609 and 610.

In certain application scenarios of a practical application, HTML codes of a fragment may need to be invalidated prior to a predetermined caching time. Use the "shopkeeper information" fragment as an example. Caching time of the "shopkeeper information" fragment may be one day and the "shopkeeper information" may be changed prior to the end of one day. In this situation, HTML codes of the fragment that are stored in the caching system may be modified, and previously cached contents may be deleted.

It is noted from blocks 609 and 610 that, when invalidating HTML codes of a fragment, a hash calculation may be performed using a fragment name and a fragment parameter to obtain a 32-digit result that may serve as a fragment ID to delete HTML codes corresponding to the fragment ID from the caching system.

At 611, the process caches values of response headers other than the HTML codes in the caching system.

In this exemplary embodiment of the present disclosure, if a header is cached, and when HTML codes of a particular fragment are added to the caching system, certain transactions may require to cache information included in response headers in addition to the HTML codes. Caching the HTML codes without caching values of the response headers may disrupt normal operations of the transactions. For example, when accessing a "product detail" web page, corresponding language version information may exist. This language version information may be saved in a response header in a form of "_lang=gbk". When the "product detail" web page returns a result to the client, corresponding "_lang=gbk" is also returned. In this way, HTML codes of a certain fragment may be guaranteed to be the same in different web pages.

When this block is implemented, which response header value that is currently used by the transaction system and needs to be cached may be configured in advance. The configuration information and related information of the fragment may be stored together in the caching system. Upon caching, if a fragment in a requested web page of the user has a corresponding response header value in the caching system, corresponding response header value may further be returned when the HTML codes are returned.

In this exemplary embodiment, the caching system may be implemented through a distributed server cluster, where the distributed server cluster can adopt horizontal expansion approach to increase the number of servers serving as the caching system. As such, if any one of the servers has stored HTML codes of a fragment, other servers of the distributed cluster may not need to store the HTML codes. Further, the technical scheme described in the exemplary embodiments can allow recursive nesting of fragments without restricting number of levels, and setting different cache times for each fragment. Moreover, if caching for a header is needed, a value required in a response header of a certain fragment may be cached when the fragment's HTML codes are cached.

Fourth Exemplary Embodiment

Figure 7:
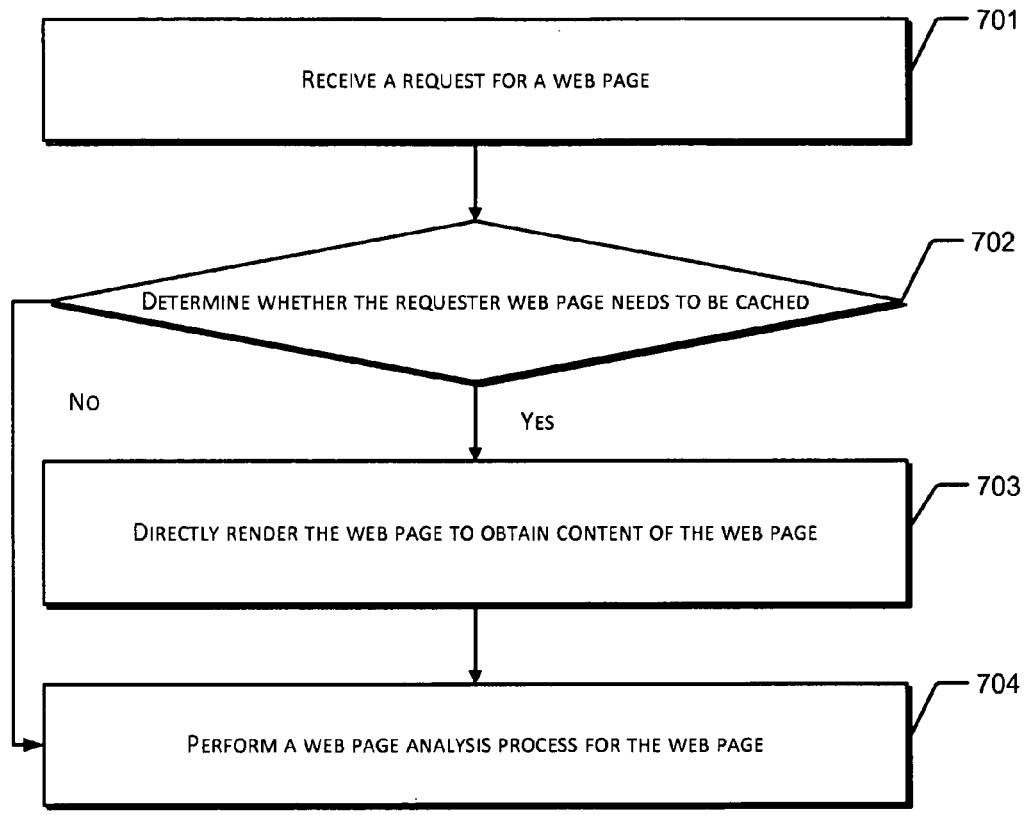
FIG. 7 is a flow chart illustrating a method of processing web page caching in accordance with a fourth exemplary embodiment of the present disclosure.

FIG. 7 shows a flow chart illustrating a fourth exemplary method of processing web page caching. This exemplary embodiment can be understood as an example application of the method of processing web page caching, which may include the following method operations illustrated as blocks in FIG. 7.

At 701, a request for a web page is received.

At 702, it is determined whether to perform page caching for the requested web page. If yes, the process continues to block 703. If not, the process continues to block 704. More specifically, this exemplary embodiment describes a process for handling web page caching. The technical schemes described in previous three exemplary embodiments describe scenarios in which a web page does not need to be cached, but certain fragments of the web page may need to be cached. This exemplary embodiment determines whether a web page needs to undergo whole page caching. If a web page requested by a user needs to be cached, the web page may be directly rendered in subsequent processing. If the user's requested web page does not need to be cached, the rendering process may be performed for various fragments of the web page.

At 703, the process directly performs rendering for the web page to obtain content of the web page. HTML codes of the web page may be obtained by rendering the entire web page directly. In a practical application, a 32-digit web ID may be obtained by performing a hash calculation on a web page name and a web page parameter. Based on this web ID, corresponding HTML codes of the web page may be found from the caching system. If the HTML codes cannot be found, corresponding HTML codes may be searched from a database or the Internet. Content specific to the web page may be obtained based on returned search results. The web page parameter may refer to a parameter that the web server transmits to the caching apparatus based on the web page requested by the user. For example, when users search a web page, URLs of the web page are the same having the only difference to be the parameter, for example:

www.xxx.com/aaa.htm?user=[x]&userName=[x].

At 704, the process performs a web page analysis of the web page. The web page analysis may include obtaining first-level fragment information of the web page, successively performing fragment analysis for first-level fragments based on the first-level fragment information. This fragment analysis process includes rendering the first-level fragments based on preset nesting information of the first-level fragments. The nesting information includes information about whether a current fragment includes other fragments. The web page analysis then includes combining rendering results of the rendering to generate complete content of the first-level fragments of the web page.

This block relates to a scenario in which a web page does not need to be cached, but some fragments may need to be cached. Since a process of implementation under this scenario has been described in detail in previous three exemplary embodiments, the implementation process is not repeatedly described herein.

This exemplary embodiment may perform caching for a web page, implementing a rendering process corresponding to either a situation in which the web page needs to be cached but a fragment thereof does not need to be cached, or a situation in which the web page does not need to be cached but some fragments need to undergo nested caching.

Fifth Exemplary Embodiment

Figure 8:
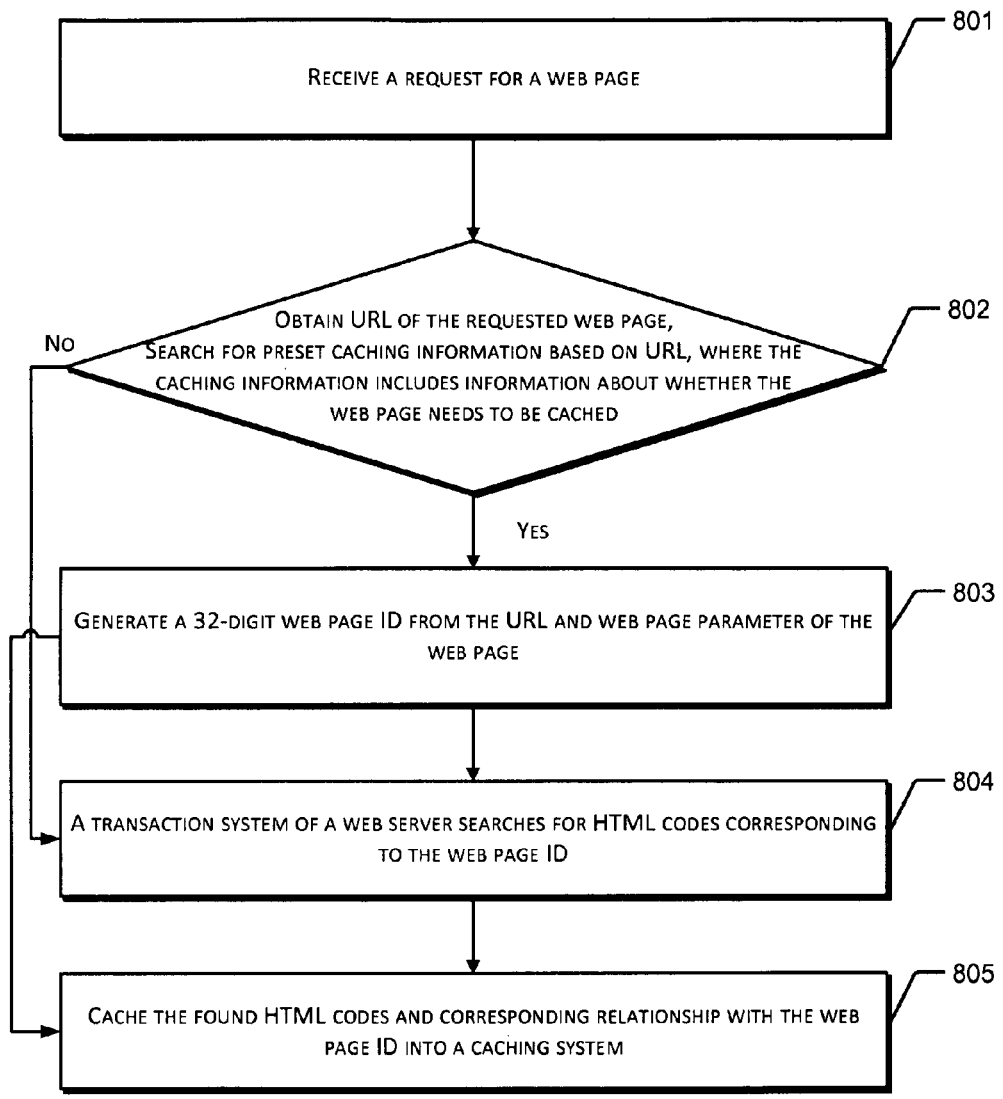
FIG. 8 is a flow chart illustrating a method of processing web page caching in accordance with a fifth exemplary embodiment of the present disclosure.

FIG. 8 shows a flow chart illustrating a fifth exemplary method of processing web page caching. This exemplary embodiment can be understood as an example application of the method of processing web page caching, which may include the following method operations illustrated as blocks in FIG. 8.

At 801, a request for a web page is received.

At 802, the process obtains a URL of the web page, and finds predetermined caching information based on the URL of the web page. The caching information may include information about whether the web page needs to undergo whole page caching. If whole page caching is needed, the process continues to block 803. If whole page caching is not needed, the process continues to block 805.

In this exemplary embodiment, the configuration server 106 may store caching information of the web page. Further, the configuration server 106 may update the stored caching information, and send the updated caching information to the caching apparatus 103. The caching apparatus may initiatively obtain corresponding caching information from the configuration server. The caching information includes information about whether the web page needs to undergo whole page caching.

At 803, the process generates a 32-digit web page ID from the web page's URL and web page parameter. In one implementation, this block performs a hash calculation on the web page's URL and web page parameter to generate a 32-digit web page ID. The process continues to block 804.

At 804, the process searches for corresponding web page HTML codes from the caching system based on the web page ID. The 32-digit web page ID obtained at block 803 may be used as a keyword to search for corresponding web page HTML codes from the caching system. In one implementation, the transaction system 105 of the web server 102 will be responsible for finding HTML codes corresponding to the web page ID.

At 805, the process caches the found HTML codes and corresponding relationship with the web page ID into the caching system. At this block, if the web page that needs to be cached cannot be found in the caching system, a corresponding relationship between the HTML codes and the web page ID that is found, as well as the HTML codes, are stored in the caching system after block 805.

It is noted that during caching of a web page, if the web page needs to be cached and if a caching time of the web page has not expired and HTML codes of the web page have been updated, the web page may be voluntarily invalidated. The meaning of voluntarily invalidity and corresponding implementation have been described in the foregoing embodiments and therefore are not repeatedly described herein.

For the sake of description, various embodiments described above have been presented as a series of actions. One of ordinary skills in the art should appreciate that the present disclosure is not construed by the order of actions described above. Based on the present disclosure, certain blocks may be performed in a different order or in parallel. Further, one of ordinary skills in the art should appreciate that the exemplary embodiments described herein are preferred embodiments. Actions and modules involved therein may not be essential for the present disclosure.

Sixth Exemplary Embodiment

Figure 9:
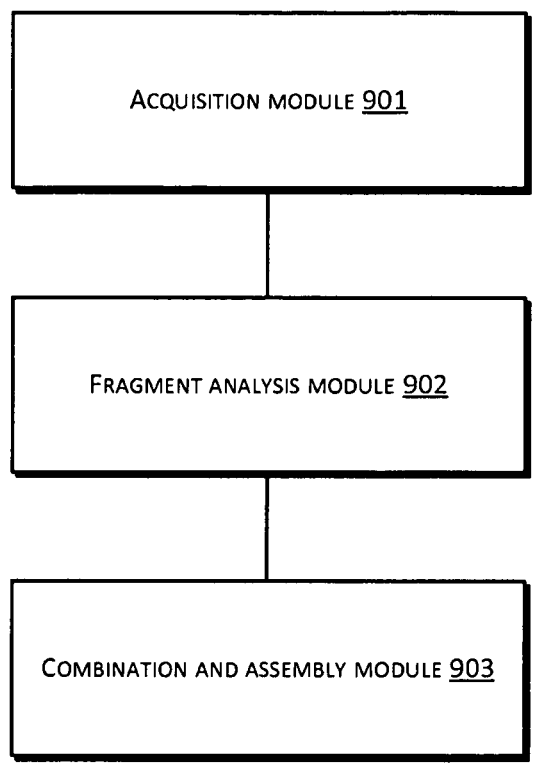
FIG. 9 is a structural diagram illustrating an apparatus of processing web page caching in accordance with a sixth exemplary embodiment of the present disclosure.

Counterpart to the first exemplary method of web page caching, the present disclosure further provides an apparatus of processing web page caching in accordance to the sixth exemplary embodiment as shown in FIG. 9. The apparatus may include one or more functional components that may be implemented in hardware and/or software. The apparatus includes an acquisition module 901 configured to obtain first-level fragment information of a web page in response to receiving a request for the web page.

A fragment analysis module 902 is also provided in communication with the acquisition module 901 and configured to perform a fragment analysis process for first-level fragments based on first-level fragment information obtained by the acquisition module 901. The fragment analysis process performed by the module 902 includes rendering the first-level fragments based on predetermined nesting information of the first-level fragments, wherein the nesting information includes information about whether a current fragment includes other fragments.

A combination and assembly module 903 is provided in communication with the fragment analysis module 902 and is configured to combine rendering results of the rendering to generate complete content of the first-level fragments of the web page.

When a fragment of a web page is cached in a nested form, this exemplary embodiment may recursively obtain HTML codes of each fragment of the web page, and combine the HTML codes to generate the first-level fragments of the web page. This solves the deficiencies of existing technology in performing nested caching of fragments of a web page and recursive rendering after nested caching of the fragments.

Seventh Exemplary Embodiment

Figure 10:
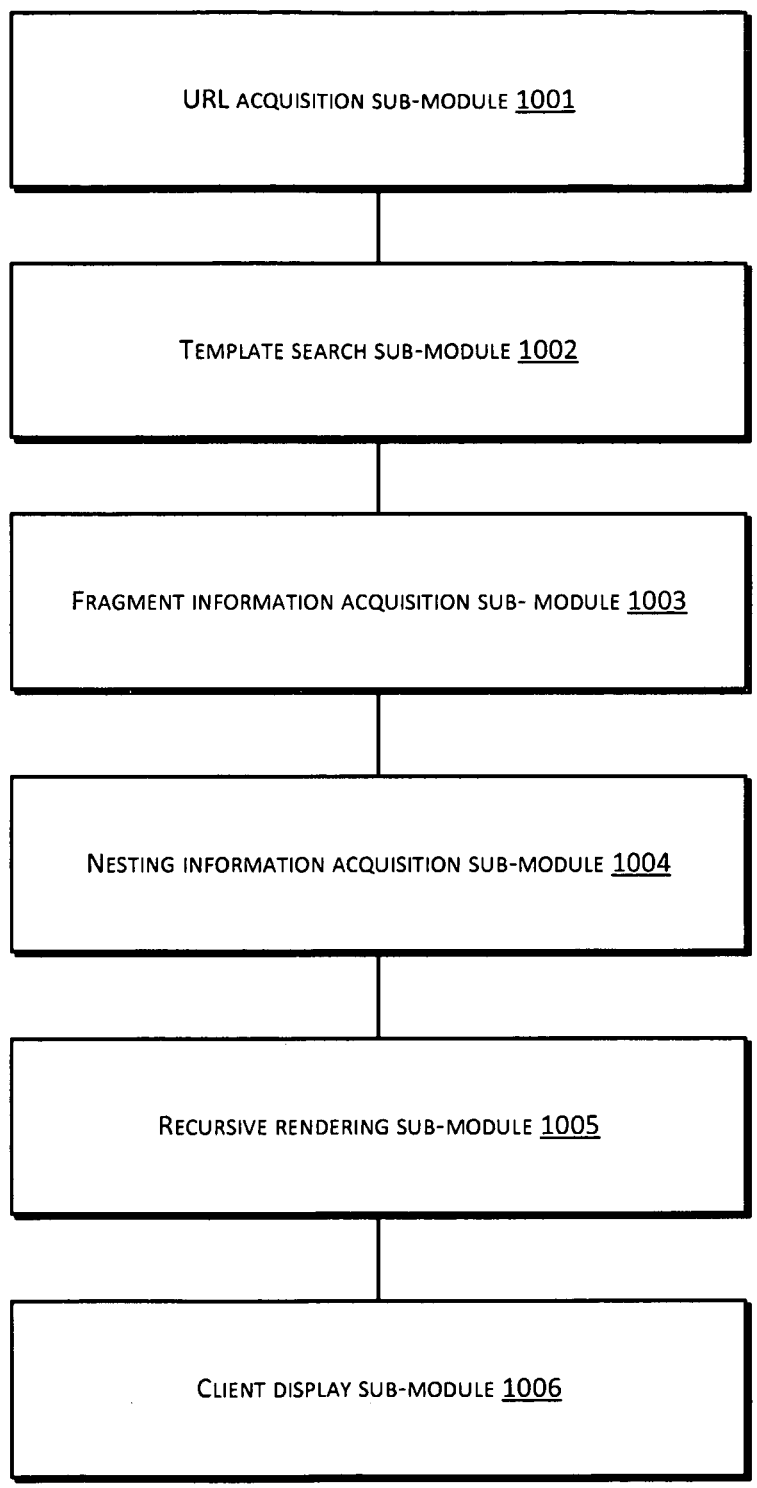
FIG. 10 is a structural diagram illustrating an apparatus of processing web page caching in accordance with a seventh exemplary embodiment of the present disclosure.

Counterpart to the second exemplary method of web page caching, the present disclosure further provides an apparatus of processing web page caching in accordance to the seventh exemplary embodiment as shown in FIG. 10. The apparatus may include one or more functional modules that may be implemented in hardware and/or software. The apparatus includes a URL acquisition sub-module 1001 for obtaining a web page's Uniform Resource Locator (URL). A template search sub-module 1002 is provided to find and obtain a template of the web page based on the web page's URL. A fragment information acquisition sub-module 1003 is provided for obtaining fragment names and fragment parameters corresponding to first-level fragments in the template of the web page. The apparatus further includes a nesting information acquisition sub-module 1004, used for successively obtaining HTML codes and nesting information of the first-level fragments based on the fragment names and the fragment parameters of the first-level fragments.

The apparatus may also implement a recursive rendering sub-module 1005 for determining whether the first-level fragment includes a second-level fragment based on the nesting information. If it does, the sub-module 1005 performs recursive rendering for the second-level fragment. The recursive rendering includes generating, for a fragment to be processed, a placeholder in a fragment which level is above the fragment to be processed and obtaining HTML codes of the fragment to be processed based on a fragment name and a fragment parameter of the fragment to be processed. Recursive rendering further includes replacing the placeholder for the fragment to be processed by the HTML codes of the fragment to be processed and continuously determining whether the second-level fragment includes a third-level fragment. If the second-fragment includes a third-level fragment, recursive rendering is performed for the third-level fragment until an N-level fragment is determined to include no fragment, where N is an integer greater than 3. If the second-level fragment does not include a third-level fragment, the rendering is terminated.

A client display sub-module 1006 may further be provided for displaying complete content of the first-level fragments in the web page of a client.

Figure 11:
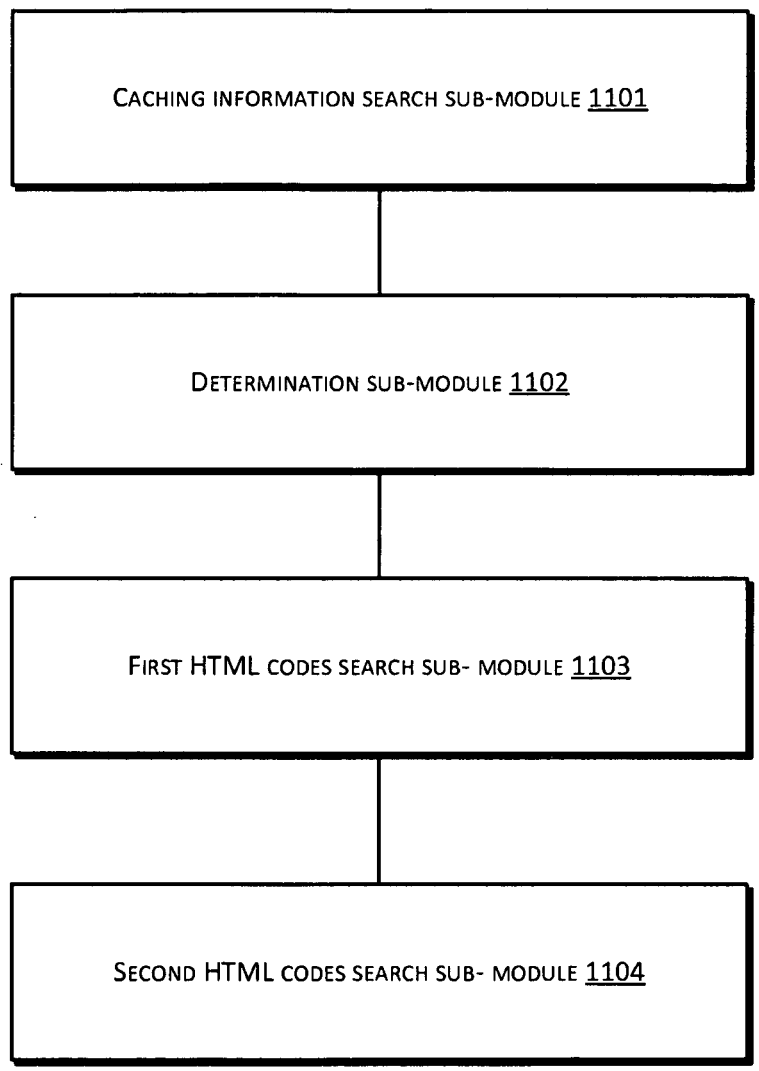
FIG. 11 is a structural diagram illustrating a nesting information acquisition sub-module 1004 described in the seventh exemplary embodiment of the present disclosure.

FIG. 11 shows one implementation of the nesting information acquisition sub-module 1004. In this implementation, a caching information search sub-module 1101 is used for searching caching information of the first-level fragments in the configuration server, where the caching information includes information about whether a fragment needs to be cached and a caching time duration of the fragment that needs to be cached. A determination sub-module 1102 is also implemented for determining whether a first-level fragment needs to be cached based on the caching information of the first-level fragment before the present time reaches the caching time duration. A first HTML codes search sub-module 1103 is used for performing a hash calculation on the fragment name and the fragment parameter of the first-level fragment to obtain a fragment ID of the first-level fragment when a result of the determination sub-module 1102 is affirmative, and finding HTML codes of the first-level fragment that corresponds to the fragment ID from the caching system. A second HTML codes search sub-module 1104 is used for triggering a transaction system of a web server to find the HTML codes corresponding to the fragment ID.

This exemplary embodiment not only allows nested fragment caching of a web page, but also recursively obtains HTML codes of each fragment when nested fragment caching of the web page is performed, thus displaying complete content of the web page to a user and remedying the gap in existing technology.

Eighth Exemplary Embodiment

Figure 12:
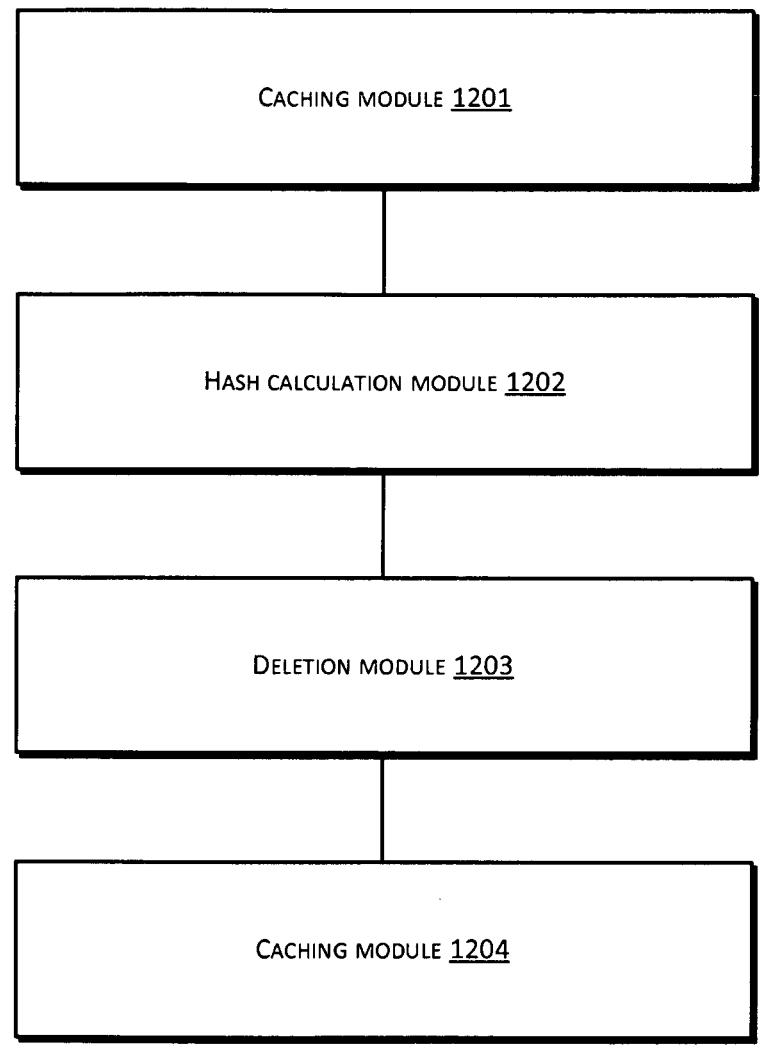
FIG. 12 is a structural diagram illustrating an apparatus of processing web page caching in accordance with an eighth exemplary embodiment of the present disclosure.

Counterpart to the third exemplary method of web page caching, the present disclosure further provides an apparatus of processing web page caching in accordance to the eighth exemplary embodiment as shown in FIG. 12. The apparatus may include a caching module 1201, used for caching the found HTML codes and corresponding relationship with the fragment ID in the caching system. A hash calculation module 1202 is also provided for performing a hash calculation on a fragment name and a fragment parameter to obtain a fragment ID of a fragment when content of the fragment changes. A deletion module 1203 is used for finding and deleting HTML codes corresponding to a fragment ID from the caching system based on the fragment ID. A caching module 1204 may also be included for caching a value of a header corresponding to the fragment's HTML codes in the caching system.

Ninth Exemplary Embodiment

Figure 13:
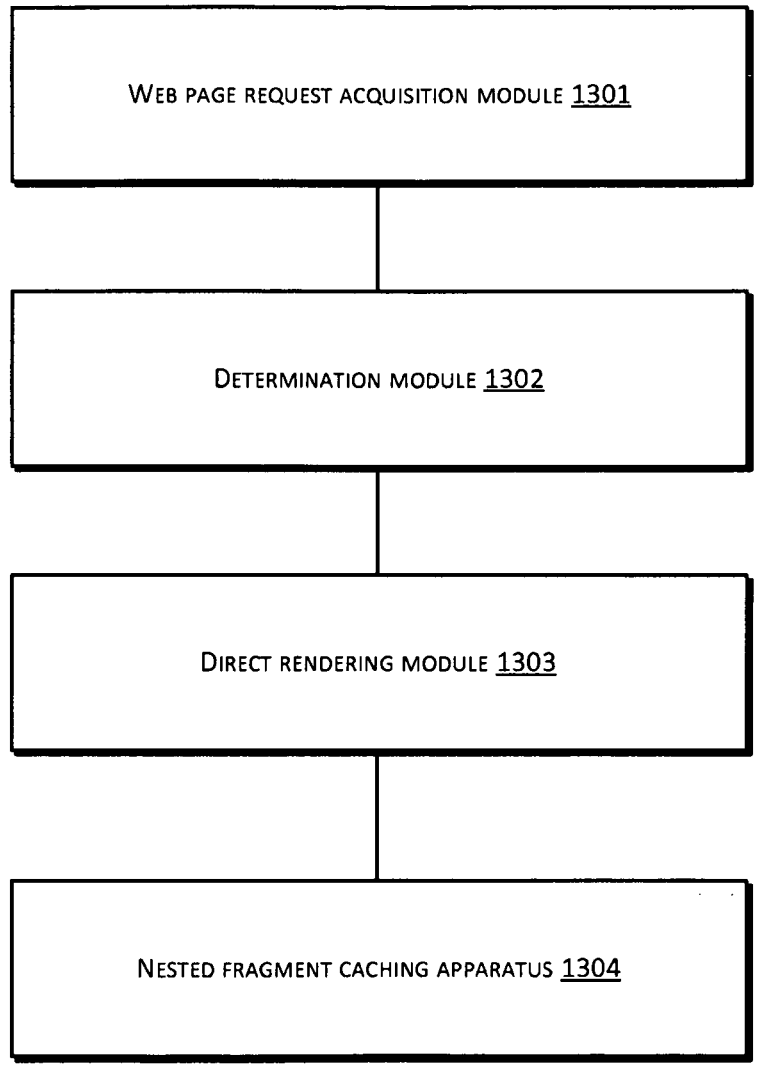
FIG. 13 is a structural diagram illustrating an apparatus of processing web page caching in accordance with a ninth exemplary embodiment of the present disclosure.

Counterpart to the fourth exemplary method of web page caching, the present disclosure further provides an apparatus of processing web page caching in accordance to the ninth exemplary embodiment as shown in FIG. 13. The apparatus may include a web page request receiving module 1301 used for receiving a request for a web page. A determination module 1302 is included for determining whether to perform page caching for the requested web page. A direct rendering module 1303 is used for directly rendering the web page to obtain content of the web page if a result of the determination module 1302 is affirmative. A nested fragment caching apparatus 1304 is used for obtaining first-level fragment information of the web page if the result of the determination module 1302 is not affirmative. The nested fragment caching apparatus 1304 successively performs a fragment analysis process for first-level fragments based on the first-level fragment information. The fragment analysis process includes rendering the first-level fragments based on predetermined nesting information of the first-level fragments, wherein the nesting information includes information about whether a current fragment includes other fragments, and combining rendering results of the rendering to generate complete content of the first-level fragments of the web page.

Tenth Exemplary Embodiment

Figure 14:
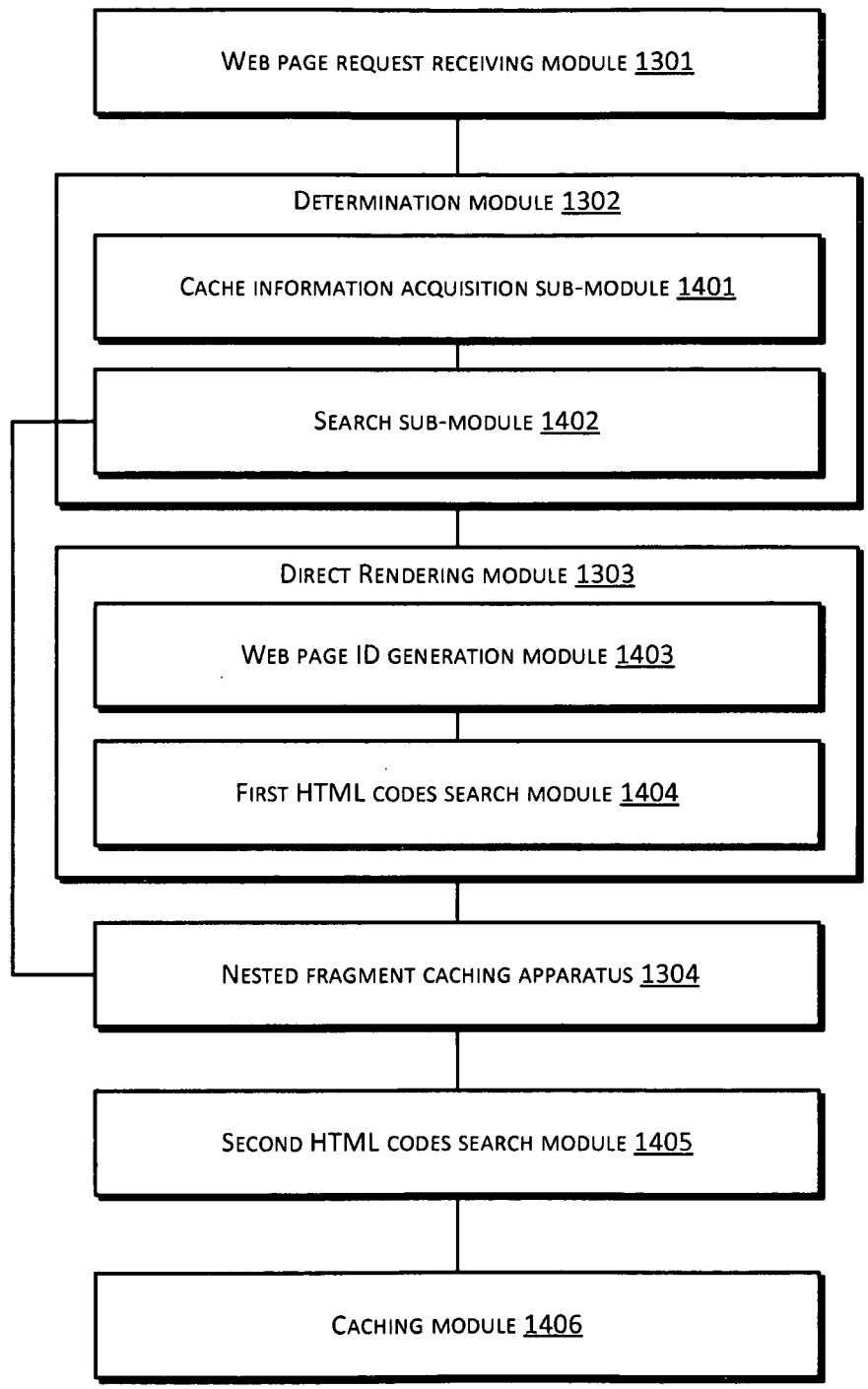
FIG. 14 is a structural diagram illustrating an apparatus of processing web page caching in accordance with a tenth exemplary embodiment of the present disclosure.

Counterpart to the fifth exemplary method of web page caching, the present disclosure further provides an apparatus of processing web page caching in accordance to the tenth exemplary embodiment as shown in FIG. 14. The apparatus shown in FIG. 14 employs many of the functional components described above with respect to FIG. 13, but provides more detail about select components.

The apparatus of FIG. 14 may include a web page request receiving module 1301 for receiving a request for a web page. The apparatus may further have a determination module 1302, which includes a cache information acquisition sub-module 1401 for obtaining the web page's URL and a search sub-module 1402 for finding predetermined caching information based on the URL. The caching information includes information about whether to perform page caching for the web page and information of caching time duration for the web page.

In this implementation, the direct rendering module 1303 may include a web page ID generation module 1403 for generating a 32-digit web page ID from the URL and web page parameter of the web page prior to an expiration of the caching time duration. Module 1303 may also implement a first HTML codes search module 1404 for finding HTML codes corresponding to the web page ID from the caching system.

The direct rendering module 1303 is further coupled to the nested fragment caching apparatus 1304, as described above with respect to FIG. 13.

The apparatus may further include a second HTML codes search module 1405 for triggering the transaction system of the web server to find HTML codes corresponding to the web page ID and a caching module 1406 for caching the found HTML codes and corresponding relationship with the web page ID in the caching system.

Eleventh Exemplary Embodiment

Counterpart to the methods and apparatuses of web page caching, the present disclosure further provides a system of processing web page caching in accordance to the tenth exemplary embodiment. The system may include a client and a web server, such as that shown in FIG. 1. Within this context, the client 101 is configured to send a request for a web page to the web server 102.

The web server 102 includes a caching apparatus 103. The caching apparatus 103 implements one or more functional modules. As one example, the caching apparatus implements the modules illustrated in FIG. 9. These modules may be implemented as electronics, firmware, and/or software stored in memory and executed by a processor.

More specifically, the caching apparatus 103 includes an acquisition module 901 configured to obtain first-level fragment information of a web page in response to receiving a request for the web page. A fragment analysis module 902 is provided to perform a fragment analysis process for first-level fragments based on first-level fragment information. The fragment analysis process includes rendering the first-level fragments based on predetermined nesting information of the first-level fragments, wherein the nesting information includes information about whether a current fragment includes other fragments. A combination and assembly module 903 is configured to combine rendering results of the rendering to generate complete content of the first-level fragments of the web page.

The present disclosure provides yet another exemplary system of processing web page caching. The system may include a client and a web server, as illustrated in FIG. 1, which allows the client to request web pages from the web server. In this implementation, the web server includes a caching apparatus that implements the modules illustrated in FIG. 13. These modules may be implemented as electronics, firmware, and/or software stored in memory and executed by a processor.

Accordingly, in this implementation, the caching apparatus includes a web page request receiving module 1301 for receiving the request for the web page and a determination module 1302 for determining whether to perform a page caching for the requested web page. A direct rendering module 1303 is included for directly rendering the web page to obtain content of the web page if a result of the determination module is affirmative. The apparatus further implements a nested fragment caching apparatus 1304 for obtaining first-level fragment information of the web page if the result of the determination module is not affirmative and successively performing a fragment analysis process for first-level fragments based on the first-level fragment information. The fragment analysis process includes rendering the first-level fragments based on predetermined nesting information of the first-level fragments, wherein the nesting information includes information about whether a current fragment includes other fragments. The nested fragment caching apparatus 1304 further combines rendering results of the rendering to generate complete content of the first-level fragments of the web page.

It is noted that various exemplary embodiments are progressively described in this disclosure. The main points of each exemplary embodiment may be different from other exemplary embodiments, and same or similar portions of the exemplary embodiments may be referenced with one another. The descriptions of exemplary apparatuses are relatively simple as these exemplary apparatuses are similar to their counterpart embodiments of exemplary methods. Related details can be found in the embodiments of exemplary methods.

Finally, it should be pointed out that any relational terms such as "first" and "second" in this document are only meant to distinguish one entity from another entity or one operation from another operation, but not necessarily request or imply existence of any real-world relationship or ordering between these entities or operations. Moreover, it is intended that terms such as "include", "have" or any other variants cover non-exclusively "comprising". Therefore, processes, methods, articles or devices which individually include a collection of features may not only be including those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

The method, apparatus and system of processing web page caching have been described in the present disclosure in detail. Exemplary embodiments are employed to illustrate the concept and implementation of the present invention in this disclosure. The exemplary embodiments are only used for better understanding of the method and the core concepts of the present invention. Based on the concepts in this disclosure, a technical person of ordinary skills in the art may modify the exemplary embodiments and application fields. All in all, contents in the present disclosure should not be construed as limitations to the disclosed methods and apparatuses.

What is claimed is:

1. A method of processing nested fragment caching of a web page, the method comprising:
   in response to receiving a request for a web page, obtaining first-level fragment information of the web page, wherein the first-level fragment information includes fragment names and fragment parameters of first-level fragments of the web page;
   performing a fragment analysis process that includes:
      obtaining, based on the first-level fragment information, nesting information of an individual first-level fragment of the first-level fragments of the web page, wherein the nesting information includes information about whether other fragments are nested within the individual first-level fragment, the individual first-level fragment includes codes that correspond to contents of the individual first-level fragment, and the nesting information is different than the codes that correspond to the contents of the individual first-level fragment;
      rendering the individual first-level fragment based at least in part on nesting information of the individual first-level fragment;
      determining, based on the nesting information of the individual first-level fragment, that the individual first-level fragment includes a nested second-level fragment; and
      rendering the nested second-level fragment;
   combining results of the fragment analysis process to generate complete content of the first-level fragments of the web page.

2. The method as recited in claim 1, wherein obtaining first-level fragment information of the web page comprises:
   obtaining a Uniform Resource Locator (URL) of the web page;
   finding a template of the web page based on the URL of the web page; and
   obtaining fragment names and fragment parameters corresponding to the first-level fragments in the template of the web page.

3. The method as recited in claim 1, wherein the performing the fragment analysis process further includes:
   searching for caching information of the individual first-level fragment from a configuration server, the caching information including information about whether the individual first-level fragment is to be cached;
   responsive to determining, based on the caching information, that the individual first-level fragment is to be cached:
      obtaining a fragment identifier ID of the individual first-level fragment by performing a hash calculation on a fragment name and a fragment parameter of the individual first-level fragment; and
   searching a caching system for HTML codes of the individual first-level fragment that correspond to the fragment ID of the individual first-level fragment; and
   responsive to determining, based on the caching information, that the individual first-level fragment is not to be cached, searching, by a transaction system of a web server, for the HTML codes that correspond to the fragment ID of the individual first-level fragment.

4. The method as recited in claim 3, wherein when the individual first-level fragment and the caching system do not include the HTML codes of the individual first-level fragment, the method further comprises:
    finding, by the web server, the HTML codes that correspond to the fragment ID of the individual first-level fragment; and
    caching, in the caching system, the found HTML codes that correspond to the fragment ID of the individual first-level fragment, wherein the found HTML codes are cached in association with the fragment ID.

5. The method as recited in claim 3, wherein the caching information further comprises information of caching time duration of the individual first-level fragment that is to be cached, and the method further comprises:
    responsive to content of the individual first-level fragment changing such that the individual first-level fragment is a changed first-level fragment within the caching time duration of the individual first-level fragment:
        obtaining a changed fragment ID of the changed first-level fragment by performing the hash calculation on a fragment name and a fragment parameter of the changed first-level fragment;
        finding, in the caching system, the HTML codes that correspond to the fragment ID of the individual first-level fragment based on the fragment ID of the individual first-level fragment; and
        deleting, from the caching system, the HTML codes that correspond to the fragment ID of the individual first-level fragment.

6. The method as recited in claim 3, wherein the method further comprises caching, in the caching system, a value of a header that corresponds to the HTML codes of the individual first-level fragment.

7. The method as recited in claim 1, wherein the rendering the nested second-level fragment comprises:
    generating, for the nested second-level fragment, a placeholder in the individual first-level fragment which level is above the nested second-level fragment;
    obtaining HTML codes of the nested second-level fragment based on a fragment name and a fragment parameter of the nested second-level fragment; and
    replacing the placeholder of the nested second-level fragment with the HTML codes of the nested second-level fragment.

8. The method as recited in claim 1, wherein performing the fragment analysis process further comprises:
    determining that the nested second-level fragment includes a nested third-level fragment; and
    recursively rendering the nested third-level fragment until a nested N-level fragment is determined to include no other fragments, wherein N is an integer greater than three.

9. A method of processing web page caching, the method comprising:
    receiving a request for a web page;
    determining that the web page is not to be cached;
    obtaining first-level fragment information of the web page and successively performing a fragment analysis process for first-level fragments based on the first-level fragment information, wherein the fragment analysis process includes:
        rendering an individual first-level fragment of the first-level fragments based on preset nesting information of the individual first-level fragment, wherein the nesting information of the individual first-level fragment includes information about whether other fragments are nested within the individual first-level fragment, the individual first-level fragment includes codes that correspond to contents of the individual first-level fragment, and the nesting information is different than the codes that correspond to the contents of the individual first-level fragment;
        determining, based on the nesting information of the individual first-level fragment, that the individual first-level fragment includes a nested second-level fragment; and
        recursively rendering the nested second-level fragment; and
    combining results of the analysis process to generate complete content of the first-level fragments of the web page.

10. The method as recited in claim 9, wherein the determining that the web page is not to be cached comprises determining whether to cache the web page, and the determining whether to cache the web page includes:
    obtaining a URL of the web page; and
    finding preset caching information of the web page based on the URL, the caching information including information about whether page caching is appropriate for the web page and information of caching time duration of the web page.

11. The method as recited in claim 9, wherein the method further comprises:
    receiving a request for another web page;
    finding preset caching information of the another web page based on a URL of the another web page, the caching information including information about whether page caching is appropriate for the another web page and information of caching time duration of the another web page;
    determining that the another web page is to be cached; and
    directly rendering the another web page, including:
        prior to an expiration of the caching time duration of the another web page, generating a 32-digit web page ID for the another web page from the URL of the another web page and a web page parameter of the another web page; and
        searching a caching system for HTML codes that correspond to the 32-digit web page ID.

12. The method as recited in claim 11, wherein if the HTML codes are not found in the caching system, the method further comprises finding, by a transaction system of a web server, the HTML codes corresponding to the web page ID.

13. An apparatus for nested fragment caching of a web page, the apparatus comprising:
    an acquisition module configured to obtain first-level fragment information of a web page in response to receiving a request for the web page;
    a fragment analysis module configured to perform a fragment analysis process for first-level fragments based on the first-level fragment information, wherein the fragment analysis process includes:
        rendering the first-level fragments based on predetermined nesting information of the first-level fragments;
        successively obtaining HTML codes and nesting information of the first-level fragments based on fragment names and fragment parameters of the first-level fragments, wherein the nesting information of an individual first-level fragment of the first-level fragments includes information about whether other fragments are nested within the individual first-level fragment, the individual first-level fragment includes HTML codes that correspond to contents of the individual first-level fragment, and the nesting information is different than the HTML codes that correspond to the contents of the individual first-level fragment; and determining whether a first-level fragment includes a nested second-level fragment based on the nesting information, and if affirmative, recursively rendering the nested second-level fragment; and a combination and assembly module configured to combine rendering results of the rendering to generate complete content of the first-level fragments of the web page.

14. The apparatus as recited in claim 13, wherein the acquisition module is further configured to obtain a Uniform Resource Locator (URL) of the web page and find a template of the web page based on the URL of the web page, and the acquisition module obtains fragment names and fragment parameters corresponding to the first-level fragments in the template of the web page.

15. An apparatus for caching a web page, the apparatus comprising:

a web page request receiving module configured to receive a request for a web page;

a determination module configured to determine whether to perform page caching for the requested web page;

a direct rendering module configured to directly render the web page to obtain content of the web page if the determination module determines to perform web caching; and a nested fragment caching apparatus configured to:
obtain first-level fragment information of the web page if the determination module determines not to perform web caching;
successively perform a fragment analysis process for first-level fragments based on the first-level fragment information, wherein the fragment analysis process includes:
obtaining nesting information of the first-level fragments, wherein the nesting information of an individual first-level fragment of the first-level fragments includes information about whether other fragments are nested within the individual first-level fragment, the individual first-level fragment includes codes that correspond to contents of the individual first-level fragment, and the nesting information is different than the codes that correspond to the contents of the individual first-level fragment;
rendering the first-level fragments based on the nesting information of the first-level fragments;
determining, based on nesting information of an individual first-level fragment of the first-level fragments, that the individual first-level fragment includes a nested second-level fragment; and
responsive to determining that the individual first-level fragment includes the nested second-level fragment, recursively rendering the nested second-level fragment; and
combine rendering results of the rendering the first-level fragments to generate complete content of the first-level fragments of the web page.

16. The apparatus as recited in claim 15, wherein the determination module is configured to obtain a URL of the web page and find preset caching information based on the URL, and the caching information includes information about whether page caching is appropriate for the web page and information of caching time duration of the web page.

17. The apparatus as recited in claim 15, wherein the direct rendering module is configured to:
generate, prior to an expiration of the caching time duration, a 32-digit web page ID from the URL and a web page parameter of the web page; and
search a caching system for HTML codes that correspond to the 32-digit web page ID.

18. The apparatus as recited in claim 17, wherein if the direct rendering module does not find the HTML codes in the caching system, the apparatus finds the HTML codes corresponding to the web page ID by accessing a transaction system of a web server.

19. The method as recited in claim 1, further comprising dynamically obtaining the nesting information of the first-level fragments from a configuration server during the analysis process of the first-level fragments.

* * * * *